March 31, 1970     L. F. URRY     3,503,811

DRY CELL WITH NOVEL VENTING MEANS

Filed June 21, 1968

INVENTOR
LEWIS F. URRY

United States Patent Office

3,503,811
Patented Mar. 31, 1970

3,503,811
DRY CELL WITH NOVEL VENTING MEANS
Lewis F. Urry, North Olmsted, Ohio, assignor to Union Carbide Corporation, a corporation of New York
Filed June 21, 1968, Ser. No. 738,934
Int. Cl. H01m 1/02, 1/06
U.S. Cl. 136—178                                    6 Claims

ABSTRACT OF THE DISCLOSURE

A novel valve vent is provided for a dry cell employing a cylindrical cupped anode, a central cathode rod protruding through the open end of the cupped anode and a flat, annular, insulating closure disc surrounding the cathode rod within the open end of the cupped anode, wherein an annular, arcuate shape, resilient seal member is fixed at its innermost peripheral edge on top of the closure disc around the cathode rod and overlying a venting aperture provided in the disc, the outer peripheral edge of the seal member being biased in resilient pressure sealing contact with the flat surfaces of the closure disc forming a seal around the venting aperture. Upon the development of a predetermined gas pressure within the cell, the arcuate shape resilient seal member is deflectable at its outer peripheral edge in a direction away from the closure disc momentarily breaking the seal around the venting aperture and allowing gas to escape from inside the cell.

---

Figure 1:
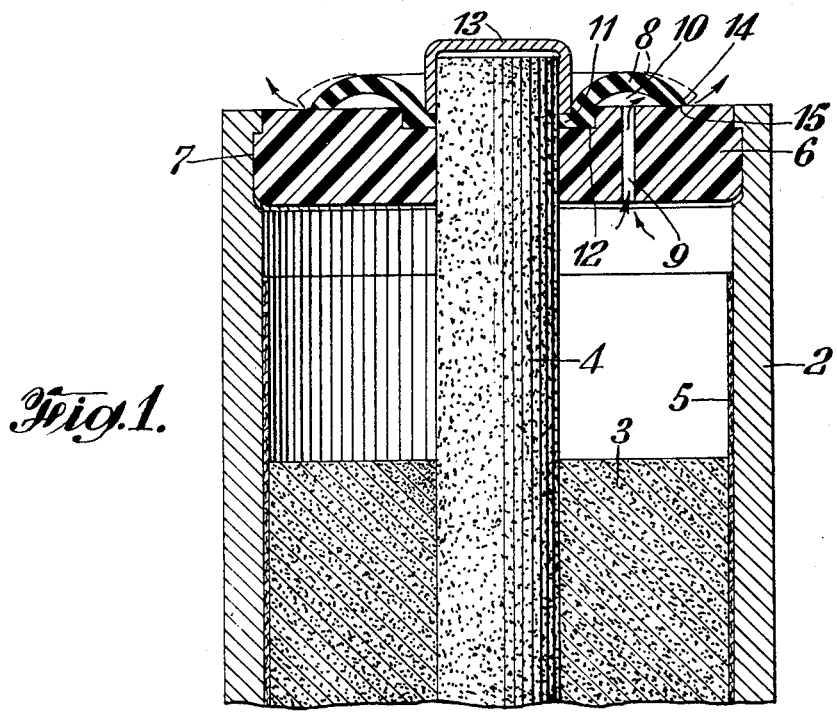

This invention relates to dry cells and especially dry cells employing a magnesium anode, and more specifically concerns the provision of novel venting means for releasing gas pressure developed during discharge of such cells.

Magnesium dry cells are ideally suited for use as the power source in many applications were a high working voltage is required. As compared to the conventional Leclanché dry cell with a zinc anode, magnesium cells operate at a voltage of about 0.3 volt higher under conditions of equivalent current drain. Despite this rather significant advantage, magnesium cells have not yet attained widespread use primarily because they have been plagued by many difficulties.

One of the most serious difficulties encountered with magnesium cells is that of gas generation and possible build-up of dangerous gas pressure during discharge of the cells. This is due to the rather poor efficiency of the active magnesium anode which reacts wastefully with water in the electrolyte to produce hydrogen gas in copious quantities.

In the past, Leclanché dry cells have employed venting means for releasing gas pressure developed within the cell. Usually this venting means has consisted of an open diffusion vent of one type or another formed within the cell closure. While this type of venting means may be satisfactory for a Leclanché dry cell, it is by no means suitable for use in a magnesium cell since an open diffusion vent is not capable of rapidly releasing large quantities of gas from inside the cell. A magnesium cell generally will produce gas on normal discharge at a rate of up to one thousand times faster than a Leclanché dry cell which does not generate gas in serious quantities until the cell has been completely discharged.

Another disadvantage of an open diffusion type vent as used in prior Leclanché dry cells is that it too readily permits the continued loss of moisture from the cell. For extended shelf life, a magnesium cell must be capable of retaining substantially all of its initial water content and consequently the cell is required to be hermetically sealed during the period of shelf storage.

Still another disadvantage of such prior diffusion type vents is that they are open at all times during discharge as well as when the cell is on shelf. Ideally, venting means for a magnesium cell should be capable of maintaining the cell in a sealed condition during shelf storage and then rapidly releasing copious quantities of gas generated when the cell is discharged. In addition, the venting means should be capable of resealing itself once the gas pressure has been released. Moreover, the venting means used must be simple in construction and inexpensive to manufacture.

It is therefore an important object of this invention to provide a novel and improved venting means for a dry cell.

A more specific object of this invention is to provide a novel and improved venting means for a magnesium cell which will maintain the cell in a sealed condition during the time that the cell is on shelf storage but which is capable of rapidly releasing gas pressure from inside the cell when copious quantities of gas are generated.

Another object of this invention is to provide such a novel and improved venting means which is capable of resealing itself once the gas pressure has been released.

Still another object of this invention is to provide such a novel and improved venting means which is simple in construction, inexpensive to manufacture and which is constructed from parts forming the sealed closure of the cell.

The foregoing and other objects of the invention are achieved by the provision of a novel valve vent in a dry cell employing a cylindrical cupped anode, a central cathode rod extending beyond the open end of the cupped anode and a flat insulating annular closure disc surrounding the cathode rod and sealing the open end of the anode. The novel valve vent is provided in the form of an annular, arcuate shape resilient seal member disposed around the cathode rod and overlying a venting aperture provided within the closure disc of the cell. The annular, arcuate shape resilient seal member is fixed at its innermost peripheral edge portion to the closure disc around the cathode rod and has its outer peripheral edge portion lying in pressure sealing contact against the flat surface of the closure disc forming a seal around the venting aperture which prohibits moisture loss from the cell.

During discharge of the cell, any excessive gas pressure that may develop is applied through the venting aperture in the closure disc against the underneath side of the annular arcuate shape resilient seal member causing it to be displaced in a direction away from the closure disc, thus breaking the seal around the venting aperture and allowing gas to escape from inside the cell.

Figure 2:
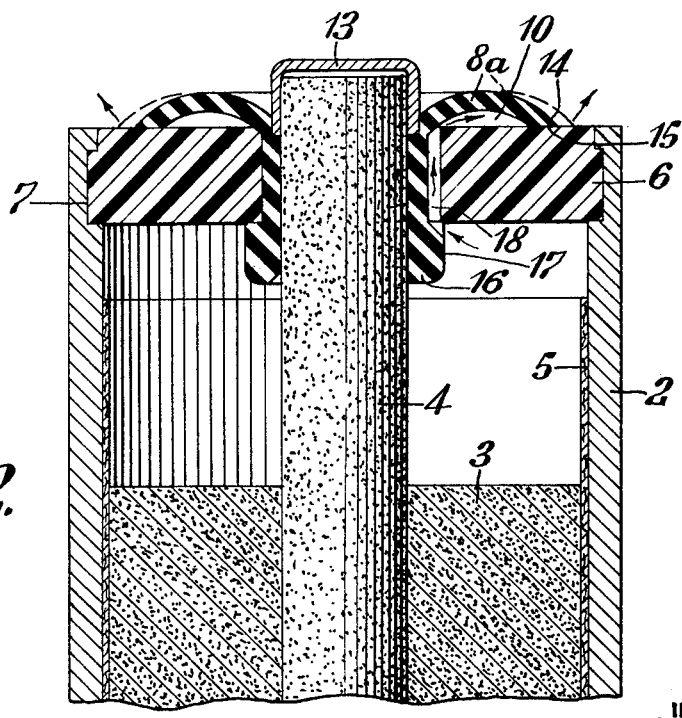

Reference will now be made in the ensuing specification to the accompanying drawings which show specific embodiments of the invention, and wherein:

FIGURE 1 is an elevation view in section of a dry cell provided with the novel valve vent, only the upper portion of the cell being shown for purposes of illustration; and FIGURE 2 is a similar view of a dry cell provided with a modified valve vent in accordance with the invention.

Referring to FIGURE 1, there is shown a dry cell embodying the invention. The cell includes a cylindrical cupped anode 2 composed of a consumable metal such as magnesium or an alloy thereof, for example. Within the cupped anode 2 is a cathode bobbin consisting of a manganese dioxide depolarizer mixture 3 and a central carbon cathode rod 4. The cathode rod 4 is embedded within the depolarizer mixture 3 and extends at its upper end beyond the open end of the cupped anode 2. An ion permeable separator in the form of a bibulous paper sleeve 5 surrounds the cathode bobbin between the depolarizer mixture 3 and the interior side wall of the cupped anode 2. The separator may consist of a methyl cellulose coated paper, for example.

The closure for the cell comprises a flat insulating annular disc 6 suitably of a plastic material, which is tightly fitted around the upper end of the cathode rod 4 within the open end of the cupped anode 2. The insulating disc 6 is made slightly larger in diameter along its lower peripheral edge portion than the inside diameter of the cupped anode 2 and is force fitted through its open end so that the enlarged peripheral edge portion of the disc 6 is locked in engagement with a peripheral groove 7 on the upper interior side wall of the cupped anode 2. The resiliency of the cupped anode 2 causes its side wall to be forced radially inwardly into tight physical contact around the peripheral edge of the insulating disc 6 whereby an effective liquid and gas tight seal is attained between the disc 6 and the side wall of the cupped anode 2.

The valve vent in accordance with the invention is provided in the form of an annular, arcuate shape, resilient seal member 8 of substantially uniform thickness which is mounted on top of the insulating disc 6 around the cathode rod 4 and overlying a venting aperture 9. As denoted by the reference numeral 10, the arcuate shape of the seal member 8 forms an annular gas space on top of the disc 6 which communicates through the venting aperture 9 with the interior of the cell. Suitably, the seal member 8 may be made from any gas impermeable, resilient material such as neoprene or rubber, for example.

In the embodiment of the valve vent shown in FIGURE 1, the seal member 8 is formed with an innermost flanged peripheral edge portion 11 which resides in an annular groove or slot 12 provided around the inner edge of the insulating disc 6. The flanged edge portion 11 of the seal member 8 fits snugly around the cathode rod 4 and assures that a good liquid and gas tight seal is attained between the cathode rod 4 and the insulating disc 6. A metal terminal cap 13 fits on top of the cathode rod 4 and is pressed down tightly over the flanged edge portion 11 of the seal member 8, thus rigidly affixing the innermost edge of the seal member 8 to the insulating disc 6.

At its outermost peripheral edge portion indicated at 14, the seal member 8 is unfixed and free to move in a direction away from the top flat surfaces of the insulating disc 6. However, in the normally closed position of the valve vent, the seal member 8 due to both its resiliency and arcuate shape or configuration is biased at its outer peripheral edge portion 14 into resilient pressure sealing contact with the disc 6, sealing the gas space 10 and consequently the venting aperture 9 against the escape of gas or moisture from inside the cell. Preferably, the outer peripheral edge portion 14 of the seal member 8 is formed with a substantially flat surface as shown at 15 to provide a more effective seal with the insulating disc 6.

During the time that the cell is on shelf storage or on initial discharge when little if any gas is generated, the valve vent is maintained in its normally closed position and there it little if any loss of moisture from inside the cell. However, when the cell is discharged, copious quantities of gas may be generated which can give rise to the build-up of an excessive or unsafe internal gas pressure inside the cell. When this predetermined gas pressure is reached, the gas pressure within the gas space 10 acting on the underneath side of the seal member 8 causes its outermost peripheral edge portion 14 to deflect upwardly or in a direction away from the insulating disc 6, momentarily breaking the seal around the periphery of the seal member 8 and allowing gas to escape from the cell. Once the gas pressure has been released, the seal member 8 at its outer peripheral edge portion 14 returns to its initial pressure biased position on top of the insulating disc 6, thus resealing the valve vent.

An important feature of the invention is the ability of the present valve vent to open and release gas from inside the cell at substantially lower internal gas pressures than heretofore possible with prior valve vents of its type. This is due largely to the arcuate shape or configuration of the seal member 8 forming the gas space 10 which provides a far greater area of gas contact than if the sealing member were disposed directly over the venting aperture as in similar devices of the prior art. Thus the gas pressure acts on the whole underneath surface of the arcuate shape sealing member 8 in the gas space 10 and consequently a much larger force is applied to open the valve vent at any predetermined gas pressure inside the cell. Because the gas pressure acts on a large surface area, the valve vent is therefore capable of venting gas at very low internal pressures, e.g. at about 5 pounds per square inch.

FIGURE 2 illustrates a modification of the valve vent which is basically the same as that described before but in which the annular, arcuate shape, resilient seal member 8a is fixed at its innermost edge by means of an integrally formed tubular sleeve or grommet 16 interposed in sealing relation between the insulating disc 6 and the carbon cathode rod 4. Preferably as shown, the tubular sleeve or grommet 16 is formed with a flanged lower edge portion 17 for assuring that a good seal is attained between the cathode rod 4 and insulating disc 6.

In the modification of FIGURE 2, the venting aperture may be provided in the form of a slot or groove 18 adjacent to the central opening in the annular insulating disc 6. Of course, a venting hole may also be formed through the disc 6 as shown in FIGURE 1.

From the foregoing, it will be seen that the present invention provides a novel and improved valve vent for a dry cell which is capable of maintaining the cell in a sealed condition during the time that the cell is on shelf storage but which is capable of rapidly venting gas from inside the cell when a predetermined excessive gas pressure is reached and then resealing itself once the gas pressure has been released. The present valve vent offers the advantage in that it can vent gas from inside the cell at very low internal pressures as compared to similar devices of the prior art.

What is claimed is:
1. In a dry cell, the combination of:
  (a) a cylindrical cupped anode having an open end;
  (b) a central cathode rod protruding through the open end of said cupped anode;
  (c) a flat annular closure disc mounted within the open end of said cupped anode and surrounding said cathode rod, said closure disc having a venting aperture therein; and
  (d) an annular, arcuate shape, resilient seal member fitted around said cathode rod and overlying said venting aperture, said resilient seal member forming an annular gas space on top of said closure disc which communicates through said venting aperture with the interior of said cell, the innermost peripheral edge portion of said seal member being fixed to said closure disc and the outer peripheral edge portion being biased in resilient pressure sealing contact with the flat surfaces of said closure disc but being deflectable in a direction away from said closure disc upon the development of a predetermined gas pressure within said cell.

2. The dry cell as defined by claim 1 wherein the annular, arcuate shape, resilient seal member is formed with a flanged innermost peripheral edge portion which resides within a corresponding groove provided in the closure disc and wherein a metal terminal cap is fitted over said cathode rod having its lower edges mounted on top of said flanged peripheral edge portion of said sealing member.

3. The dry cell as defined by claim 2 wherein the outer peripheral edge portion of said resilient seal member is formed with a flat surface which lies in resilient pressure sealing contact with the flat surfaces of said closure disc.

4. The dry cell as defined by claim 1 wherein the annular, arcuate shape, resilient seal member is formed integrally with a tubular sleeve portion which is interposed in tight sealing relation between said cathode rod and said closure disc.

5. The dry cell as defined by claim 4 wherein the tubular sleeve portion is formed with a flanged lower edge disposed adjacent to the underneath side of said closure disc for assuring a tight seal around said cathode rod.

6. The dry cell as defined by claim 4 wherein the venting aperture is formed by a groove provided adjacent to the central opening in said closure disc.

References Cited

UNITED STATES PATENTS

| | | | |
|---|---|---|---|
| 2,060,799 | 11/1936 | Drummond | 136—133 |
| 2,322,210 | 6/1943 | Adams | 136—100 |

ALLEN B. CURTIS, Primary Examiner

D. L. WALTON, Assistant Examiner

U.S. Cl. X.R.

136—133